US012726558B2

(12) United States Patent
Feng et al.

(10) Patent No.: US 12,726,558 B2
(45) Date of Patent: Sep. 1, 2026

(54) SYNCHRONOUS ROTATION MECHANISM AND FOLDABLE ELECTRONIC DEVICE

(71) Applicant: Honor Device Co., Ltd., Shenzhen (CN)

(72) Inventors: Lei Feng, Shenzhen (CN); Yameng Wei, Shenzhen (CN); Haifei Li, Shenzhen (CN); Handong Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 209 days.

(21) Appl. No.: 18/701,375

(22) PCT Filed: Apr. 26, 2023

(86) PCT No.: PCT/CN2023/090824
§ 371 (c)(1),
(2) Date: Apr. 15, 2024

(87) PCT Pub. No.: WO2023/246291
PCT Pub. Date: Dec. 28, 2023

(65) Prior Publication Data

US 2024/0406296 A1 Dec. 5, 2024

(30) Foreign Application Priority Data

Jun. 22, 2022 (CN) ........................ 202210710244.3

(51) Int. Cl.
*H04M 1/02* (2006.01)

(52) U.S. Cl.
CPC .................................. *H04M 1/022* (2013.01)

(58) Field of Classification Search
CPC .................................................... H04M 1/002
(Continued)

(56) References Cited

U.S. PATENT DOCUMENTS 8,894,062 B1 * 11/2014 Chen ...................... B65H 3/063
271/131
10,659,576 B1 * 5/2020 Hsu ...................... G06F 1/1624
(Continued)

FOREIGN PATENT DOCUMENTS

CN 206539598 U 10/2017
CN 110782791 A 2/2020
(Continued)

*Primary Examiner* — April G Gonzales
(74) *Attorney, Agent, or Firm* — Leydig, Voit & Mayer, Ltd.

(57) ABSTRACT

This application discloses a synchronous rotation mechanism and a foldable electronic device, and relates to the field of electronic device technologies. The synchronous rotation mechanism is used in a foldable electronic device. The synchronous rotation mechanism includes torque swing arms and a sliding member. The torque swing arms on two sides of the sliding member are connected by the sliding member. The torque swing arms are rotatably connected to the sliding member by sliders and helical slots, so that when the torque swing arm on one side rotates, the slider and the helical slot synchronously drive the sliding member to slide in a direction perpendicular to rotation of the torque swing arm, and then to drive the torque swing arm on another side to rotate synchronously.

10 Claims, 8 Drawing Sheets

(58) Field of Classification Search
USPC ........................................................ 455/575.3
See application file for complete search history.

(56) References Cited

U.S. PATENT DOCUMENTS

| | | | | |
|---|---|---|---|---|
| 10,664,021 | B1 * | 5/2020 | Hsu | H04B 1/3888 |
| 11,372,453 | B2 * | 6/2022 | Yu | F16C 11/12 |
| 11,408,214 | B1 * | 8/2022 | Hsu | H04M 1/022 |
| 11,630,491 | B2 * | 4/2023 | Huang | G06F 1/1616 361/679.01 |
| 11,662,769 | B2 * | 5/2023 | Lin | H04M 1/0235 361/679.27 |
| 11,703,916 | B2 * | 7/2023 | Tian | G06F 1/1616 361/679.27 |
| 2007/0084014 | A1 * | 4/2007 | Tseng | H04M 1/0247 16/343 |
| 2007/0199178 | A1 * | 8/2007 | Katsumata | E05F 1/1261 16/286 |
| 2008/0081505 | A1 * | 4/2008 | Ou | H04M 1/0237 439/374 |
| 2010/0084951 | A1 * | 4/2010 | Bestle | G06F 1/1681 16/297 |
| 2011/0169213 | A1 * | 7/2011 | Iwata | B65H 3/0607 271/171 |
| 2011/0226922 | A1 * | 9/2011 | Ishizaki | F16B 47/006 248/363 |
| 2014/0165329 | A1 * | 6/2014 | Wildforster | E05F 3/227 16/71 |
| 2015/0021457 | A1 * | 1/2015 | Liu | F16M 13/00 248/688 |
| 2015/0037071 | A1 * | 2/2015 | Yamamoto | G03G 15/0879 399/258 |
| 2015/0052707 | A1 | 2/2015 | Lin | |
| 2015/0189777 | A1 * | 7/2015 | Hsu | F16H 25/06 16/366 |
| 2015/0315832 | A1 * | 11/2015 | Wu | E05F 5/006 16/68 |
| 2015/0327383 | A1 * | 11/2015 | Hsu | G06F 1/1616 16/366 |
| 2016/0011632 | A1 * | 1/2016 | Hsu | H05K 5/0226 16/354 |
| 2018/0275725 | A1 * | 9/2018 | Lin | H04M 1/0268 |
| 2020/0081494 | A1 * | 3/2020 | Lin | H04M 1/0268 |
| 2020/0084305 | A1 * | 3/2020 | Lin | H04M 1/0268 |
| 2020/0131832 | A1 * | 4/2020 | Bernhagen | E05F 11/04 |
| 2021/0208641 | A1 * | 7/2021 | Huang | H04M 1/022 |
| 2021/0325927 | A1 * | 10/2021 | Hsu | G06F 1/1616 |
| 2021/0355725 | A1 * | 11/2021 | Hsu | E05D 3/18 |
| 2021/0355988 | A1 * | 11/2021 | Cheng | G06F 1/1681 |
| 2021/0357000 | A1 * | 11/2021 | Deng | H04M 1/022 |
| 2022/0046813 | A1 * | 2/2022 | Cheng | G09F 9/301 |
| 2022/0121249 | A1 * | 4/2022 | Li | G06F 1/1616 |
| 2022/0137675 | A1 * | 5/2022 | Kuramochi | G06F 1/1652 361/679.27 |
| 2022/0159856 | A1 * | 5/2022 | Xie | G06F 1/1681 |
| 2022/0221912 | A1 * | 7/2022 | Hsu | H04M 1/022 |
| 2022/0247843 | A1 * | 8/2022 | Hu | G06F 1/1681 |
| 2022/0303371 | A1 * | 9/2022 | Liao | H04M 1/0216 |
| 2022/0321683 | A1 * | 10/2022 | Luo | H04M 1/0268 |
| 2022/0342456 | A1 * | 10/2022 | Shen | H05K 5/0221 |
| 2022/0407950 | A1 * | 12/2022 | Huang | H04M 1/0268 |
| 2022/0413562 | A1 * | 12/2022 | Kim | G06F 1/1652 |
| 2023/0047119 | A1 * | 2/2023 | Yang | F16C 11/04 |
| 2023/0050832 | A1 * | 2/2023 | Yang | H04M 1/022 |
| 2023/0105988 | A1 * | 4/2023 | Yang | G06F 1/1618 361/660 |
| 2023/0151656 | A1 * | 5/2023 | Yang | G06F 1/1681 360/266.6 |
| 2024/0007554 | A1 * | 1/2024 | Cheng | G06F 1/1681 |

FOREIGN PATENT DOCUMENTS

| | | | |
|---|---|---|---|
| CN | 111357261 | A | 6/2020 |
| CN | 112153188 | A | 12/2020 |
| CN | 112466205 | A | 3/2021 |
| CN | 213575135 | U | 6/2021 |
| CN | 113067924 | A | 7/2021 |
| CN | 113366927 | A | 9/2021 |
| CN | 113969934 | A | 1/2022 |
| CN | 215805713 | U | 2/2022 |
| CN | 114321596 | A | 4/2022 |
| GB | 2611136 | A | 3/2023 |
| JP | 2015121238 | A | 7/2015 |
| WO | 2020029062 | A1 | 2/2020 |
| WO | 2021259340 | A1 | 12/2021 |

* cited by examiner

SYNCHRONOUS ROTATION MECHANISM AND FOLDABLE ELECTRONIC DEVICE

CROSS-REFERENCE TO RELATED APPLICATIONS

This application is a national stage of International Application No. PCT/CN2023/090824, filed on Apr. 26, 2023, which claims priority to Chinese Patent Application No. 202210710244.3, filed on Jun. 22, 2022. The disclosures of both of the aforementioned applications are hereby incorporated by reference in their entireties.

TECHNICAL FIELD

This application relates to the field of electronic device technologies, and in particular, to a synchronous rotation mechanism and a foldable electronic device.

BACKGROUND

The development of science and technology enables an era of large-screen intelligent terminals. To resolve problems that conventional tablet computers are large in size and inconvenient to carry as well as a small screen of a mobile phone and poor use experience of a user, foldable screen mobile phones are emerging.

Currently, the foldable screen technology has found a good compromise between the miniaturization development of a main body of an electronic device and a large size of a display screen. For example, a foldable screen mobile phone has the same size as a regular mobile phone after being folded, and is convenient for a user to carry. When a foldable screen is unfolded, the user can get a screen with a large display area. Different from a conventional flip phone, the folding of a foldable screen mobile phone is based on the folding of a flexible screen. Through a foldable screen rotation mechanism, the flexible foldable screen can be folded at will within a specific angle range. However, rotating shaft mechanisms of most existing foldable screens are large in size, and are not conducive to the development of miniaturization of a main body of a mobile phone. In addition, ensuring the synchronous rotation of left and right screens of a foldable screen mobile phone is also one of the basic requirements for the foldable screen mobile phone.

Therefore, how to implement a rotating shaft mechanism that occupies small space while satisfying synchronous rotation of left and right screens of a foldable screen mobile phone has become an urgent problem to be resolved.

SUMMARY

Embodiments of this application provide a synchronous rotation mechanism and a foldable electronic device, to reduce space occupied by a rotation mechanism of a foldable screen. This facilitates miniaturization of a foldable electronic device, to improve carry and use experience of a user.

According to a first aspect, a synchronous rotation mechanism is provided, used in a foldable electronic device, including:

a sliding member, where a first helical slot and a second helical slot are respectively provided on two sides of the sliding member; and a first torque swing arm and a second torque swing arm, respectively located at the two sides of the sliding member. The first torque swing arm and the second torque swing arm are rotatably connected to the sliding member separately.

The first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm.

The second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm.

Optionally, the first torque swing arm may be connected to the sliding member by a shaft sleeve and a cylinder shaft. The second torque swing arm may also be connected to the sliding member by a shaft sleeve and a cylinder shaft.

According to the synchronous rotation mechanism provided in this implementation, a small size of the synchronous rotation mechanism can reduce an area of a foldable electronic device occupied by the synchronous rotation mechanism while ensuring a rotation requirement of a foldable screen, so that an overall size of the foldable electronic device can satisfy a miniaturization design, to facilitate carrying by a user, thereby improving user experience.

With reference to the first aspect, in some implementations of the first aspect, the synchronous rotation mechanism further includes:

a first main swing arm, connected to the first torque swing arm by a slide slot or a pin shaft; and a second main swing arm, connected to the second torque swing arm by a slide slot or a pin shaft.

It should be understood that when the user rotates a housing on one side of the foldable screen, a rotation force may be first applied to the first main swing arm or the second main swing arm through the housing, and then the first main swing arm may drive the first torque swing arm to synchronously rotate by the slide slot or the pin shaft between the first main swing arm and the first torque swing arm, or the second main swing arm may drive the second torque swing arm to synchronously rotate by the slide slot and the pin shaft between the second main swing arm and the second torque swing arm.

It should also be understood that the slide slot or the pin shaft herein is not an exhaustive example for a connection mode between the first main swing arm and the first torque swing arm or the second main swing arm and second torque swing arm. In actual application, the connection mode may have other implementations, such as a buckling manner. This not limited in embodiments of this application.

With reference to the first aspect, in some implementations of the first aspect, the first helical slot is one of a trapezoidal shape, a semicircular shape, and a rectangular shape.

The second helical slot is one of a trapezoidal shape, a semicircular shape, and a rectangular shape.

With reference to the first aspect, in some implementations of the first aspect, the first slider is a rectangular cube shape or a hemispherical shape.

The second slider is a rectangular cube shape or a hemispherical shape.

With reference to the first aspect, in some implementations of the first aspect, when the first slider and the second slider are the rectangular cube shape, the first slider is in surface contact or line contact with the first helical slot, and the second slider is in surface contact or line contact with the second helical slot.

With reference to the first aspect, in some implementations of the first aspect, when the first slider and the second slider are the hemispherical shape, the first slider is in point contact with the first helical slot, and the second slider is in point contact with the second helical slot.

With reference to the first aspect, in some implementations of the first aspect, the first slider is arranged on one side of the first torque swing arm close to the sliding member.

The second slider is arranged on one side of the second torque swing arm close to the sliding member.

With reference to the first aspect, in some implementations of the first aspect, a first shaft sleeve is provided on one side of the sliding member close to the first torque swing arm, and the first helical slot is provided at a middle position of the first shaft sleeve.

A second shaft sleeve is provided on one side of the sliding member close to the second torque swing arm, and the second helical slot is provided at a middle position of the second shaft sleeve.

With reference to the first aspect, in some implementations of the first aspect, a third shaft sleeve and a fourth shaft sleeve are respectively provided on two ends of an inner side of the first torque swing arm close to a folding part, and the first slider is arranged on a surface between the third shaft sleeve and the fourth shaft sleeve.

A fifth shaft sleeve and a sixth shaft sleeve are respectively provided on two ends of an inner side of the second torque swing arm close to the folding part, and the second slider is arranged on a surface between the fifth shaft sleeve and the sixth shaft sleeve.

With reference to the first aspect, in some implementations of the first aspect, the first slider is arranged on a recessed surface between the third shaft sleeve and the fourth shaft sleeve.

The second slider is arranged on a recessed surface between the fifth shaft sleeve and the sixth shaft sleeve.

With reference to the first aspect, in some implementations of the first aspect, the first shaft sleeve is connected to the third shaft sleeve and the fourth shaft sleeve by a same cylinder shaft, so that the first torque swing arm is rotatably connected to the sliding member.

The second shaft sleeve is connected to the fifth shaft sleeve and the sixth shaft sleeve by a same cylinder shaft, so that the second torque swing arm is rotatably connected to the sliding member.

According to a second aspect, a foldable electronic device is provided, including:

- a first housing and a second housing, where the first housing is connected to the second housing by a synchronous rotation mechanism, and the synchronous rotation mechanism includes a sliding member, a first torque swing arm, and a second torque swing arm, where
- a first helical slot and a second helical slot are respectively provided on two sides of the sliding member; and
- the first torque swing arm and the second torque swing arm are respectively located at the two sides of the sliding member, and the first torque swing arm and the second torque swing arm are rotatably connected to the sliding member separately; the first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm; and the second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm; and
- a foldable screen, where the foldable screen is flexible and foldable and is arranged on the first housing and the second housing.

DESCRIPTION OF EMBODIMENTS

Figure 1:
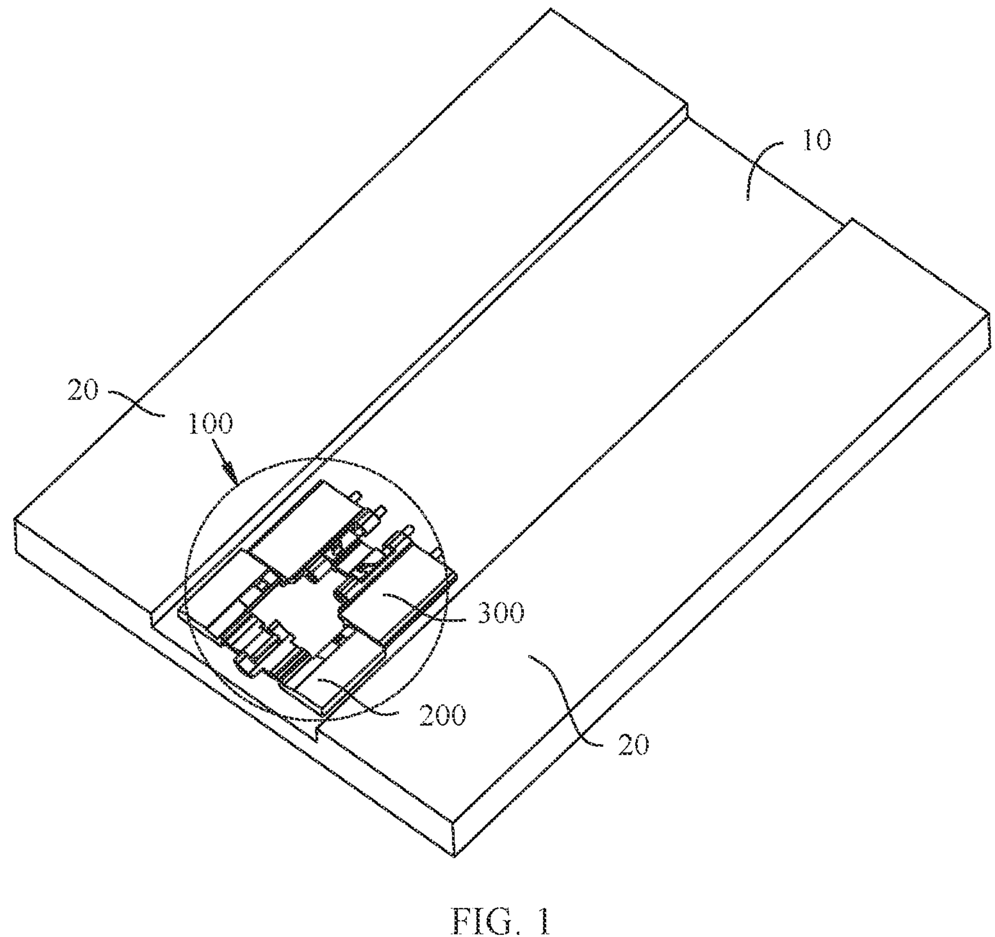
FIG. 1 is a schematic diagram of a structure of a foldable electronic device in an unfolded state according to an embodiment of this application.

It should be noted that terms used in the implementations of embodiments of this application are merely used to explain specific embodiments of this application, but are not intended to limit this application. In the descriptions of embodiments of this application, "/" means "or" unless otherwise specified. For example, A/B may represent A or B. In this specification, "and/or" describes only an association relationship between associated objects and indicates that three relationships may exist. For example, A and/or B may represent the following three cases: Only A exists, both A and B exist, and only B exists. In addition, in the description of embodiments of this application, unless otherwise specified, "a plurality of" means two or more than two, and "at least one" and "one or more" mean one, two, or more than two.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features.

Reference to "one embodiment", "some embodiments", or the like described in this specification means that a specific feature, structure, or characteristic described with reference to this embodiment is included in one or more embodiments of this application. Therefore, statements "in one embodiment", "in some embodiments", "in some other embodiments", "in some additional embodiments", and the like described in different parts in this specification do not necessarily refer to same embodiment, but mean "one or more but not all embodiments", unless otherwise specifically emphasized in other manners. The terms "comprise", "include", "have" and variants thereof all mean "include but not limited to", unless otherwise specifically emphasized in other manners.

In the descriptions of this application, it should be noted that unless otherwise explicitly specified and limited, the terms "mount" and "connect" should be understood in a broad sense. For example, a connection may be a fixed connection, a detachable connection, an integral connection, a mechanical connection, an electrical connection, mutual communication, a direct connection, an indirect connection through an intermediate medium, an internal communication between two elements, or an interaction relationship between two elements. A person of ordinary skill in the art may understand the specific meanings of the foregoing terms in this application according to specific situations.

In the description of this application, it should be understood that orientation or position relationships indicated by the terms such as "upper", "lower", "front", "rear", "side", "inner", "outer", "horizontal", and "vertical" are based on orientation or position relationships, and are used only for ease and brevity of description in this application, rather than indicating or implying that the mentioned apparatus or element needs to have a particular orientation or needs to be constructed and operated in a particular orientation. Therefore, such terms should not be construed as limiting of this application.

Currently, functions of rotation of a foldable screen and synchronous rotation of two side screens are implemented by a plurality of gears engaged. However, a gear mechanism occupies large space and is easily worn after a plurality of rotations. In this case, a trend of size miniaturization of a foldable electronic device cannot be met, and this is not conducive to improving hardware performance of the foldable electronic device.

In view of this, embodiments of this application provide a synchronous rotation mechanism and a foldable electronic device. In an overall solution of the synchronous rotation mechanism, main swing arms slide, and the main swing arm are connected to torque swing arms by slide slots and pin shafts to drive the torque swing arms to rotate. The torque swing arms on two sides of a rotating shaft of a foldable screen are connected by a sliding member, and the sliding member is connected to the torque swing arms by helical slot structures, to finally implement synchronous rotation of the main swing arms on the two sides of the rotating shaft. According to the synchronous rotation mechanism, a small size of the synchronous rotation mechanism can reduce an area of a foldable electronic device occupied by the synchronous rotation mechanism while ensuring a rotation requirement of a foldable screen, so that an overall size of the foldable electronic device can satisfy a miniaturization design, to facilitate carrying by a user, thereby improving user experience. In addition, rotation loss of the synchronous rotation mechanism can be reduced, thereby improving hardware performance of the foldable electronic device.

The foldable electronic device provided in embodiments of this application may be any device having a communication and/or storage function, for example, an intelligent device such as a mobile phone, a tablet computer, a watch, an electronic reader, a notebook computer, an on-board device, a network television, and a wearable device.

Figure 2:
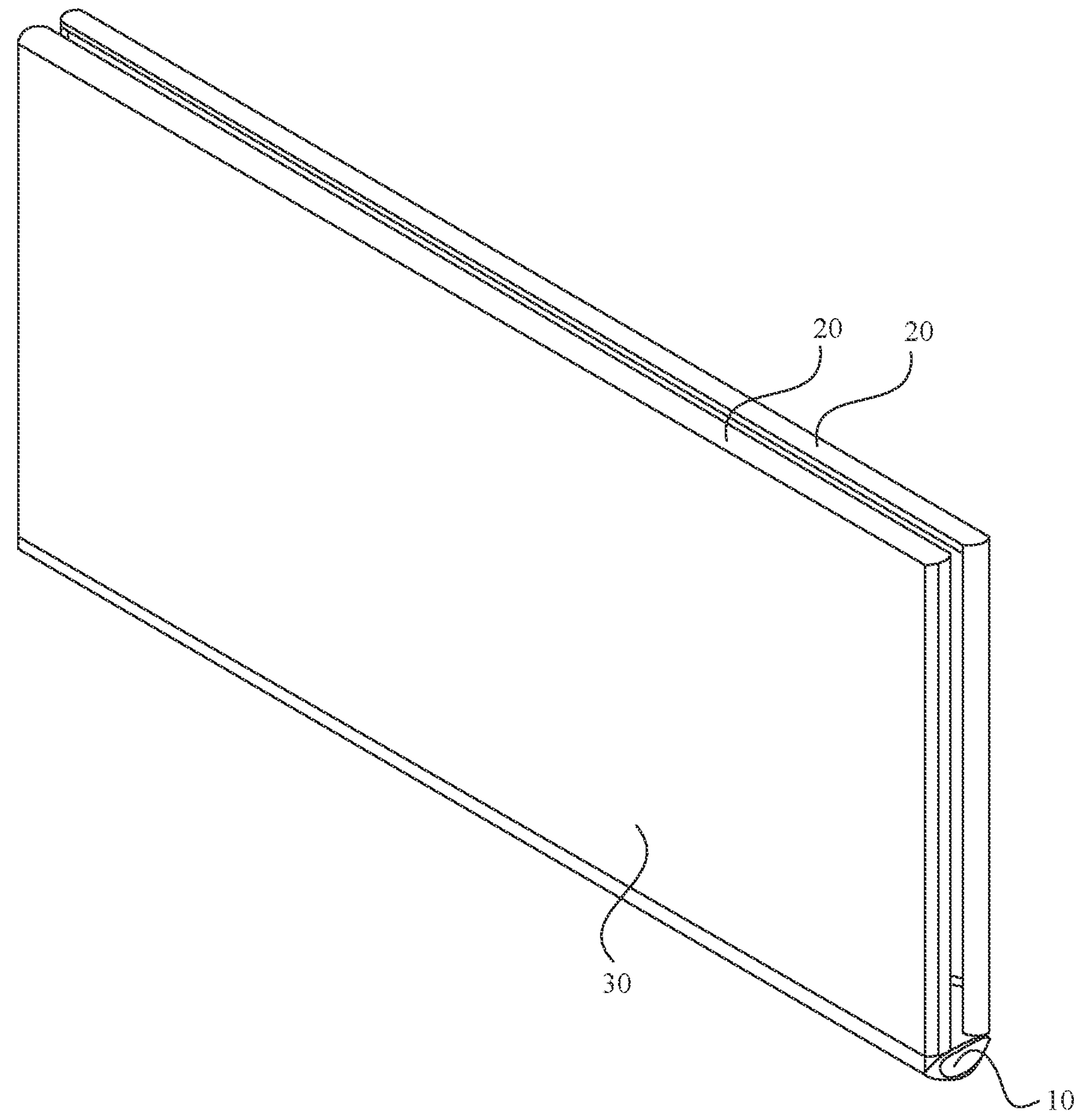
FIG. 2 is a schematic diagram of a structure of a foldable electronic device in a folded state according to an embodiment of this application.

Refer to FIG. 1 and FIG. 2. FIG. 1 is a schematic diagram of a structure of a foldable electronic device in an unfolded state according to an embodiment of this application. FIG. 2 is a schematic diagram of a structure of a foldable electronic device in a folded state according to an embodiment of this application. As an example rather than a limitation, in this embodiment, an example in which the foldable electronic device is a foldable mobile phone is used.

As shown in FIG. 1, the foldable electronic device includes a folding part 10 and a housing 20 located at two sides of the folding part 10. As shown in FIG. 2, a foldable screen 30 is mounted on the housing 20. The foldable electronic device further includes electronic elements (not shown) disposed inside the housing 20. The electronic elements include a circuit board, a processor, a camera, a sensor, a microphone, a battery, and the like, but are not limited thereto.

In this embodiment of this application, the foldable electronic device has characteristics of foldability. The housing 20 of the foldable electronic device includes two parts that is ratable relative to each other, for example, a housing (referred to as a first housing below) located at a left side of the folding part 10 and a housing (referred to as a second housing below) located at a right side of the folding part 10 shown in FIG. 1. The left side and the right side are merely used for distinguishing between position relationships of the foldable screen rather than limitations.

As shown in FIG. 1, the first housing may be connected to the second housing by a synchronous rotation mechanism 100 arranged on the folding part 10, and the first housing and the second housing may rotate about a central axis of the folding part 10 by the synchronous rotation mechanism 100. An overall structure of the synchronous rotation mechanism 100 may include a main swing arm 200 and a torque swing arm 300. The main swing arm 200 may be connected to the torque swing arm 300 in a manner of slide slots and pin shafts, but specific connection modes of the main swing arm 200 and the torque swing arm 300 are not limited in this embodiment of this application.

Figure 3:
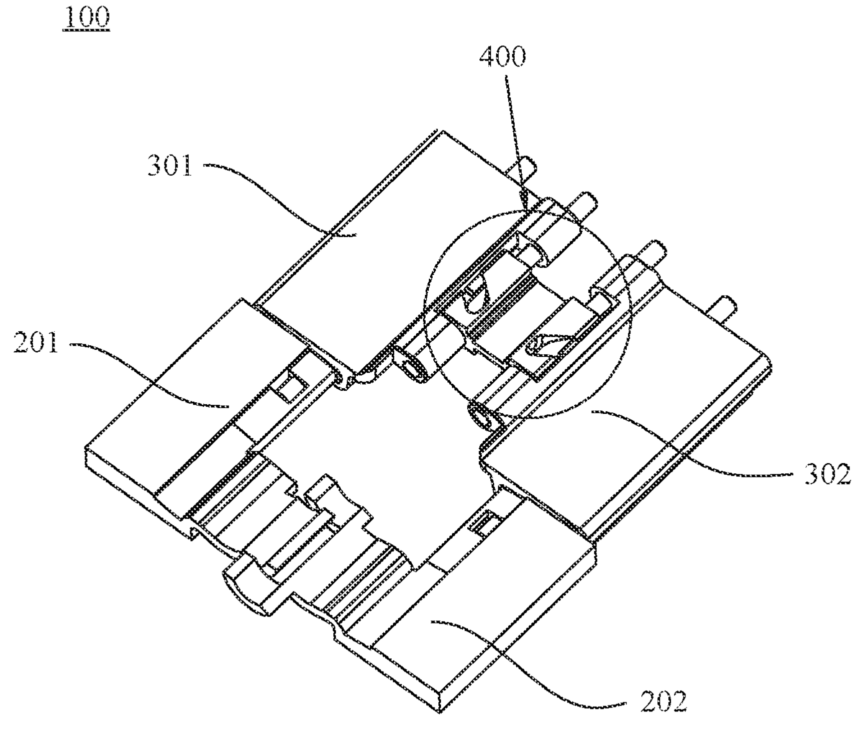
FIG. 3 is a schematic diagram of an enlarged structure of a synchronous rotation mechanism in FIG. 1 according to an embodiment of this application.

FIG. 3 is a schematic diagram of an enlarged structure of the synchronous rotation mechanism 100 in FIG. 1 according to an embodiment of this application.

As shown in FIG. 3, the main swing arm 200 includes a first main swing arm 201 located at a left side of the central axis of the folding part 10 of the foldable electronic device and a second main swing arm 202 located at a right side of the central axis of the folding part 10 of the foldable electronic device. The torque swing arm 300 includes a first torque swing arm 301 located at the left side of the central axis of the folding part 10 of the foldable electronic device and a second torque swing arm 302 located at the right side of the central axis of the folding part 10 of the foldable electronic device.

It should be noted that the left side and the right side herein are merely used for distinguishing between position relationships of the swing arm rather than limitations.

It should be further noted that the main swing arm and the torque swing arm mentioned in this embodiment of this application are all swing arms, and different names are used herein to define the swing arms (the torque swing arm and the main swing arm) to distinguish between functions and positions of different swing arms.

The first torque swing arm 301 may be connected to the second torque swing arm 302 by a sliding member 400 located between the first torque swing arm 301 and the second torque swing arm 302, and the first torque swing arm 301 and the second torque swing arm 302 may rotate by the sliding member 400.

Figure 4:
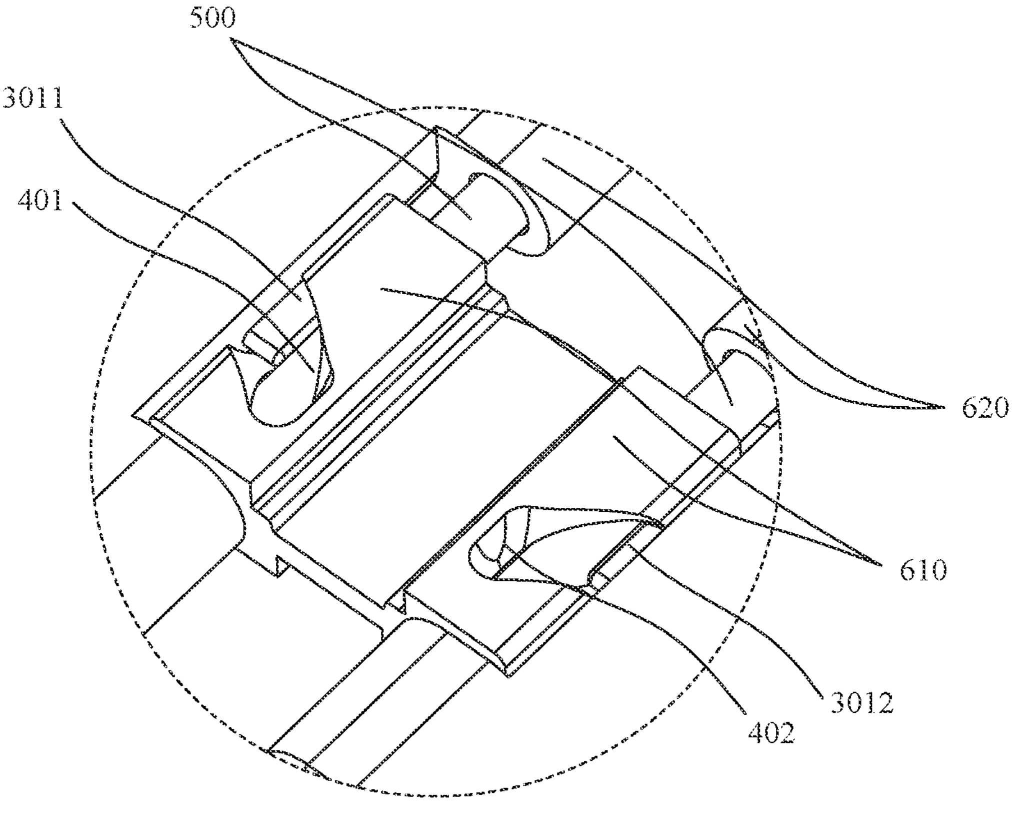
FIG. 4 is a schematic diagram of an enlarged structure of a joint part between a sliding member and a torque swing arm in FIG. 3 according to an embodiment of this application.

FIG. 4 is a schematic diagram of an enlarged structure of a joint part between the sliding member 400 and the torque swing arm 301 as well as the torque swing arm 302 in FIG. 3 according to an embodiment of this application.

FIG. 4 merely show a part of the first torque swing arm 301 and the second torque swing arm 302. As shown in FIG. 4, a first slider 3011 is arranged on the first torque swing arm 301, and a second slider 3012 is arranged on the second torque swing arm 302. The first slider 3011 is a protrusion structure on an inner side of the first torque swing arm 301 close to the sliding member 400, and the second slider 3012 is a protrusion structure on an inner side of the second torque swing arm 302 close to the sliding member 400. The first slider 3011 may be integrally connected to the first torque swing arm 301, and the second slider 3012 may be integrally connected to the second torque swing arm 302.

In some embodiments, the torque swing arm 300 (including the first torque swing arm 301 and the second torque swing arm 302) may be rotatably connected to the sliding member 400 by a connecting shaft 500, a connecting shaft sleeve 610 provided on the sliding member 400, and a connecting shaft sleeve 620 provided on the torque swing arm 300.

Figure 5:
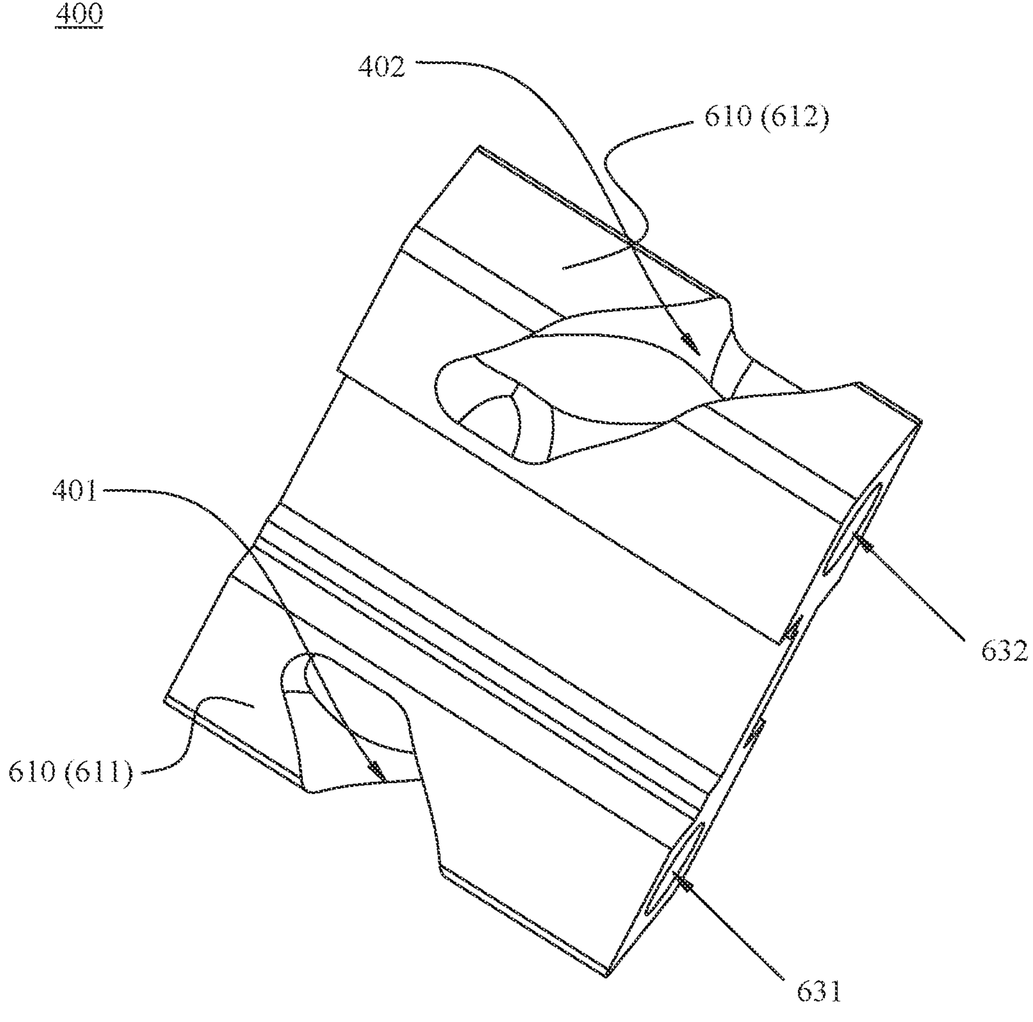
FIG. 5 is a schematic diagram of a structure of a sliding member according to an embodiment of this application.

FIG. 5 is a schematic diagram of a structure of a sliding member 400 according to an embodiment of this application.

A first shaft sleeve 610 (611) may be provided on one side of the sliding member 400 close to the first torque swing arm 301. A through hole 631 is provided on the first shaft sleeve 610 (611). The through hole 631 may be a cylindrical through hole. A second shaft sleeve 610 (612) may be provided on one side of the sliding member 400 close to the second torque swing arm 302. A through hole 632 is provided on the second shaft sleeve 610 (612). The through hole 632 may be a cylindrical through hole. The through hole 631 and the through hole 632 may have a same size.

A first helical slot 401 may be provided on the first shaft sleeve 610 (611), and a second helical slot 402 may be provided on the second shaft sleeve 610 (612).

In some embodiments, the through hole 631 may be communicated with the first helical slot 401, and the through hole 632 may be communicated with the second helical slot 402 (as shown in FIG. 5).

In some other embodiments, the through hole 631 may not be communicated with the first helical slot 401, and the through hole 632 may not be communicated with the second helical slot 402 (not shown). For example, the through hole 631 may be closer to a central line of the sliding member 400 relative to the first helical slot 401, so that the through hole 631 is staggered with a slot body of the first helical slot 401. The through hole 632 may be closer to the central line of the sliding member 400 relative to the second helical slot 402, so that the through hole 632 is staggered with a slot body of the second helical slot 402. For another example, a slot body of the first helical slot 401 may be closer to a central line of the sliding member 400 relative to the through hole 631, so that the slot body of the first helical slot 401 is staggered with the through hole 631. A slot body of the second helical slot 402 may be closer to the central line of the sliding member 400 relative to the through hole 632, so that the slot body of the second helical slot 402 is staggered with the through hole 632.

Further, still refer to FIG. 4 and FIG. 5. On the sliding member 400 provided in embodiments of this application, the first helical slot 401 may be, for example, provided at a middle position of the first shaft sleeve, and the second helical slot 402 may be, for example, provided at a middle position of the second shaft sleeve.

Figure 6:
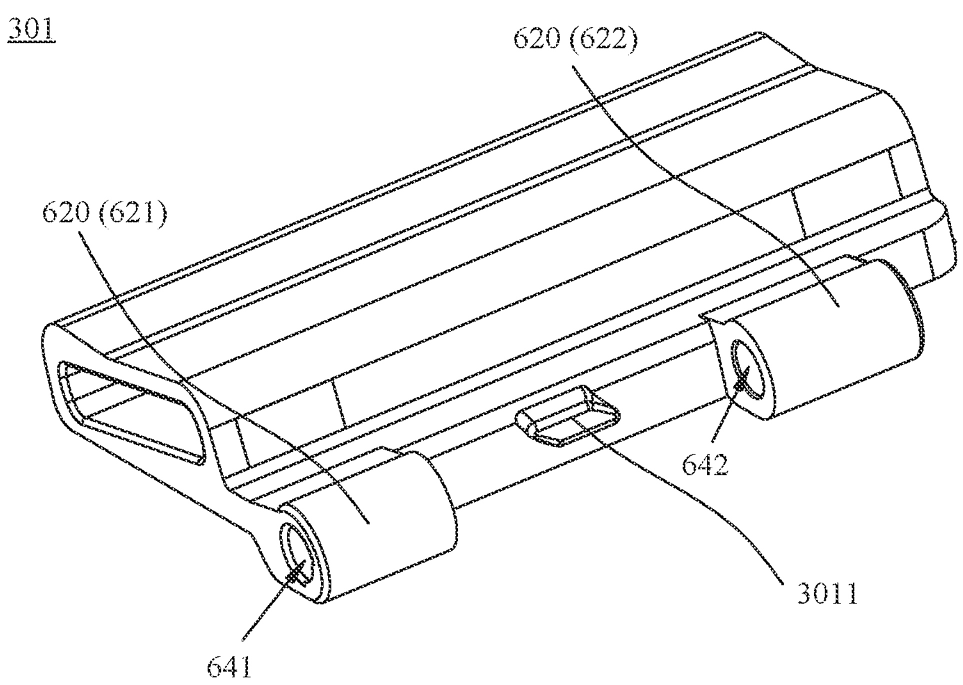
FIG. 6 is a schematic diagram of a structure of a torque swing arm according to an embodiment of this application.

FIG. 6 is a schematic diagram of a structure of a torque swing arm according to an embodiment of this application.

For ease of description, the first torque swing arm 301 is used as an example for description in this embodiment of this application. For a structure of the second torque swing arm 302, refer to descriptions of this embodiment. Details are not described again.

A third shaft sleeve 620 (621) and a fourth shaft sleeve 620 (622) may be provided on two ends of one side of the first torque swing arm 301 close to the sliding member. A through hole 641 may be provided on the third shaft sleeve 620 (621), and a through hole 642 may be provided on the fourth shaft sleeve 620 (622). The through hole 641 and the through hole 642 may be cylindrical through holes having a same radius, and the radii of the through hole 641 and the through hole 642 may also be the same as radii of the through hole 631 and the through hole 632.

When the first torque swing arm 301 and the sliding member 400 are fitted together, the through holes on the first torque swing arm 301 may be aligned with the through hole on the sliding member 400. When the second torque swing arm 302 and the sliding member 400 are fitted together, the through holes on the second torque swing arm 302 may be aligned with the through hole on the sliding member 400.

The first slider 3011 included in the first torque swing arm 301 may be located at a surface between the third shaft sleeve 620 (621) and the fourth shaft sleeve 620 (622). As shown in FIG. 6, the first slider 3011 is a protrusion structure on the first torque swing arm 301. Specifically, the first slider 3011 may be located at a middle position of an inner side of the first torque swing arm 301.

Figure 8:
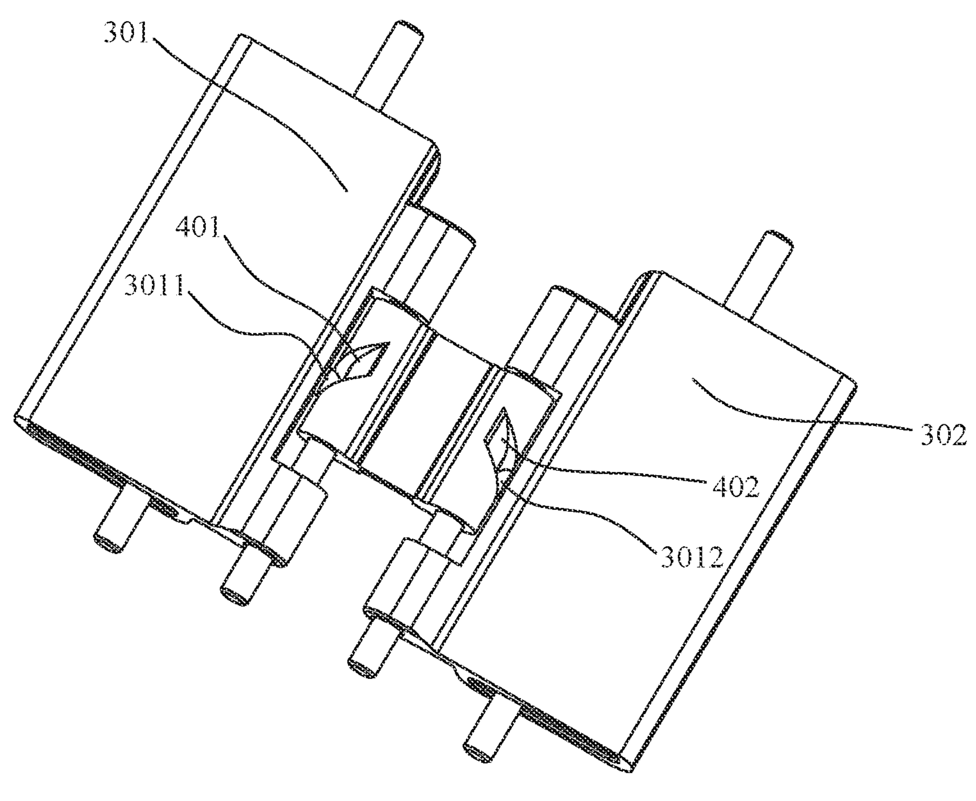
FIG. 8 is a schematic diagram of another structure of a torque swing arm and a sliding member after fitting according to an embodiment of this application.

The first slider 3011 may have various shapes, for example, a rectangular cube shape (as shown in FIG. 6) or a hemispherical shape (refer to FIG. 8). When the first slider 3011 is a rectangular cube shape, the first slider 3011 may be in surface contact or line contact with the first helical slot 401 in the sliding member 400. When the first slider 3011 is a hemispherical shape, the first slider 3011 may be in point contact with the first helical slot 401 in the sliding member 400.

In some embodiments, the third shaft sleeve 620 (621) and the fourth shaft sleeve 620 (622) may be of a raised structure, and the first slider 3011 is located on a recessed surface (as shown in FIG. 6) between the third shaft sleeve 620 (621) and the fourth shaft sleeve 620 (622). In this case, a structure of the sliding member 400 fitted to the first torque swing arm 301 may be the structure shown in FIG. 5. To be specific, the through hole 631 of the sliding member 400 is communicated with the first helical slot 401, and the through hole 632 is communicated with the second helical slot 402. The first helical slot 401 and the second helical slot 402 are recessed slot bodies relative to an edge line of the sliding member 400. When the first torque swing arm 301 and the sliding member 400 are fitted together, the shaft sleeves of the sliding member 400 may be buckled at two sides of the first slider 3011, the through holes on the shaft sleeves of the sliding member 400 may be aligned with the through holes on the shaft sleeves of the first torque swing arm 301, and the first slider 3011 may be buckled in the first helical slot 401.

Alternatively, in some other embodiments, the third shaft sleeve 620 (621) and the fourth shaft sleeve 620 (622) may be of a recessed structure, and the first slider 3011 may be located on a raised surface (not shown) between the third shaft sleeve 620 (621) and the fourth shaft sleeve 620 (622). In this case, a structure of the sliding member 400 fitted to the first torque swing arm 301 may be the foregoing structure in which a slot body of the first helical slot 401 is closer to a central line of the sliding member 400 relative to the through hole 631, so that the slot body of the first helical slot 401 is staggered with the through hole 631, and a slot body of the second helical slot 402 is closer to the central line of the sliding member 400 relative to the through hole 632, so that the slot body of the second helical slot 402 is staggered with the through hole 632. When the first torque swing arm 301 and the sliding member 400 are fitted together, the shaft sleeves of the sliding member 400 may still be buckled at two sides of the first slider 3011, the through holes on the shaft sleeves of the sliding member 400 may be aligned with the through holes on the shaft sleeves of the first torque swing arm 301, and the first slider 3011 may be buckled in the first helical slot 401.

In some embodiments, the torque swing arm 300 may be rotatably connected to the sliding member 400 by a cylinder shaft inserted into the connecting shaft sleeves of the torque swing arm 300 and the sliding member 400. Specifically, the first shaft sleeve 610 (611) on the sliding member 400 may be connected to the third shaft sleeve 620 (621) and the fourth shaft sleeve 620 (622) on the second torque swing arm 302 by a same cylinder shaft, so that the first torque swing arm 301 is rotatably connected to the 400 sliding member. The second shaft sleeve 610 (612) on the sliding member 400 may be connected to the fifth shaft sleeve and the sixth shaft sleeve (not shown) on the second torque swing arm 302 by a same cylinder shaft, so that the second torque swing arm 302 is rotatably connected to the sliding member 400.

In some embodiments, when the first torque swing arm 301 rotates around the folding part 10, the first slider 3011 arranged on the first torque swing arm 301 is driven to synchronously rotate. The first slider 3011 is buckled in the first helical slot 401. In this case, the first slider 3011 rotates in a helix direction of the first helical slot 401, to push the sliding member 400 to move in a fold line direction of the foldable electronic device, that is, move up and down in a fold line direction. The up-and-down motion of the sliding member 400 synchronously drive the second helical slot 402 to move up and down in the fold line direction, to drive the second slider 3012 to rotate, and the rotation of the second slider 3012 drives the second torque swing arm 302 to synchronously rotate, so that housings at two sides of the foldable electronic device can synchronously rotate. The fold line may be a center line of a rotating shaft when the foldable device is folding, for example, a center line of the folding part 10 shown in FIG. 1.

In some embodiments, a structure of the synchronous rotation mechanism may be an axisymmetric structure. In this case, a structure of the first helical slot 401 and a structure of the second helical slot 402 is symmetric relative to be a center line of a sliding member. When the first slider 3011 rotates at a particular angle in the first helical slot 401, the second slider 3012 may also be synchronously driven to rotate at the same angle in the second helical slot 402, so that the housing at left and right side can synchronously rotate at the same angle.

To implement different rotation angles, the helical slots in embodiments of this application may be configured with different helix angles, for example, 180° about the shaft sleeve. To be specific, after the first slider 3011 slides along the entire first helical slot 401 and the second slider 3012 slides along the entire second helical slot 402, 180°-rotation can be implemented, so that the foldable screen can rotate 180°. The helix angles of the helical slots are not specifically limited in embodiments of this application.

It should be noted that the synchronous rotation mechanism provided in embodiments of this application may be arranged on the folding part 10 of the foldable device. Specifically, the synchronous rotation mechanism may be arranged on two ends of the folding part of the foldable device, arranged at a middle position of the folding part of the foldable device, arranged throughout the folding part of the entire foldable device, or the like. This is not limited in embodiments of this application.

The sliding member 400 provided in embodiments of this application may be of a rigid structure. The first helical slot 401 and the second helical slot 402 on the sliding member 400 may be of various shapes. For example, as shown in FIG. 5, the first helical slot 401 and the second helical slot 402 on the sliding member 400 may be of a trapezoidal shape. To be specific, a width of the helical slot may decrease along an edge of the sliding member 400 toward a direction of a center, or a width of the helical slot may increase along an edge of the sliding member 400 toward a direction of a center. A position with the smallest width of the helical slot may accommodate the slider on the torque swing arm. When a housing at one side of the foldable electronic device rotates, the slider may move along the trapezoidal helical slot on the sliding member, to drive a housing on another side to rotate synchronously.

The first slider 3011 and the second slider 3012 provided in embodiments of this application may also be of a rigid structure. The first slider 3011 and the second slider 3012 may be of various shapes, for example, a rectangular cube shape or a hemispherical shape.

Figure 7:
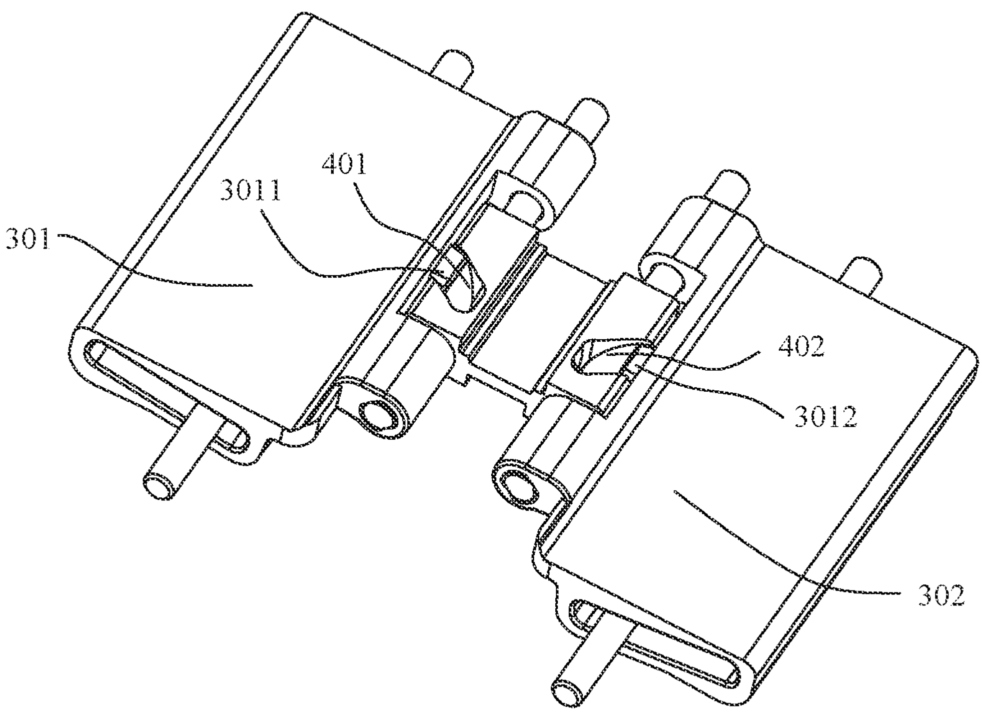
FIG. 7 is a schematic diagram of a structure of a torque swing arm and a sliding member after fitting according to an embodiment of this application.

For example, FIG. 7 is a schematic diagram of a structure after the first slider 3011 and the second slider 3012 are fitted to the sliding member 400 when both the first slider 3011 and the second slider 3012 are of a rectangular cube shape. FIG. 8 is a schematic diagram of a structure after the first slider 3011 and the second slider 3012 are fitted to the sliding member 400 when both the first slider 3011 and the second slider 3012 are of a hemispherical shape.

Figure 9:
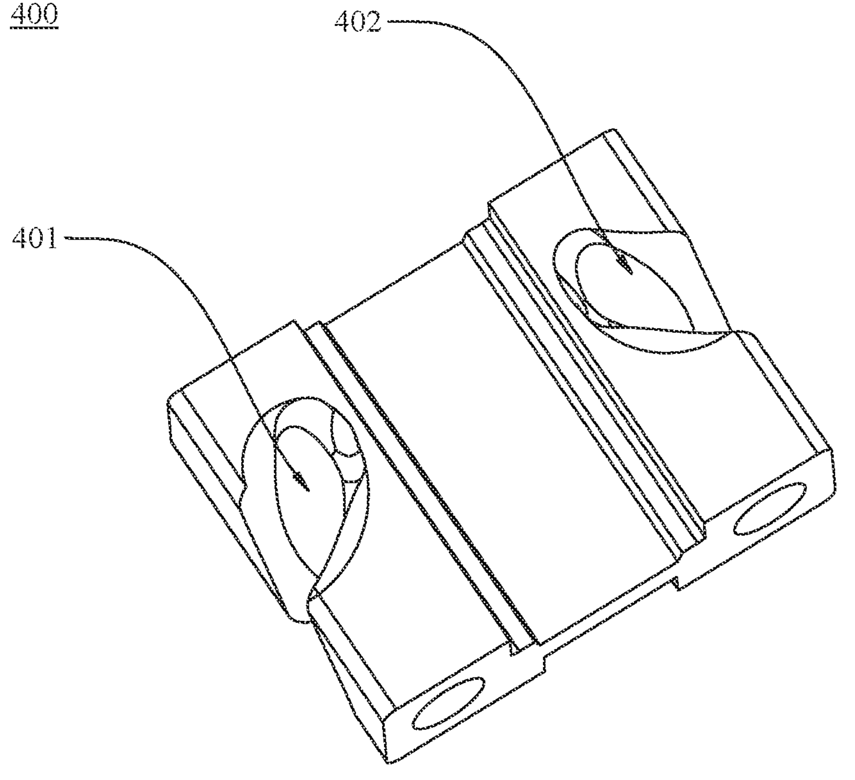
FIG. 9 is a schematic diagram of a shape of a helical slot according to an embodiment of this application.
Figure 10:
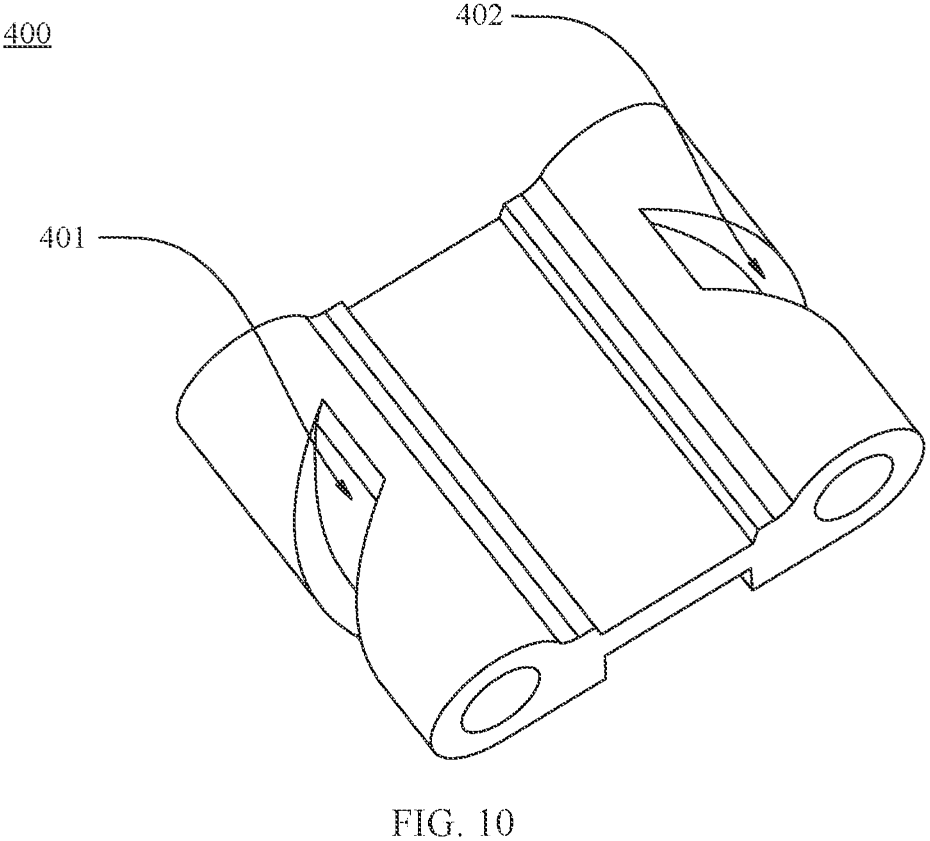
FIG. 10 is a schematic diagram of another shape of a helical slot according to an embodiment of this application.

In addition to the trapezoidal helical slot as shown in FIG. 5, the helical slot in the synchronous rotation mechanism 400 provided in embodiments of this application may alternatively be of a semicircular shape (as shown in FIG. 9), a rectangular shape (as shown in FIG. 10), or the like. This is not limited in embodiments of this application.

According to the synchronous rotation mechanism provided in embodiments of this application, a small size of the synchronous rotation mechanism can reduce an area of a foldable electronic device occupied by the synchronous rotation mechanism while ensuring a rotation requirement of a foldable screen, so that an overall size of the foldable electronic device can satisfy a miniaturization design, to facilitate carrying by a user, thereby improving user experience.

Figure 11:
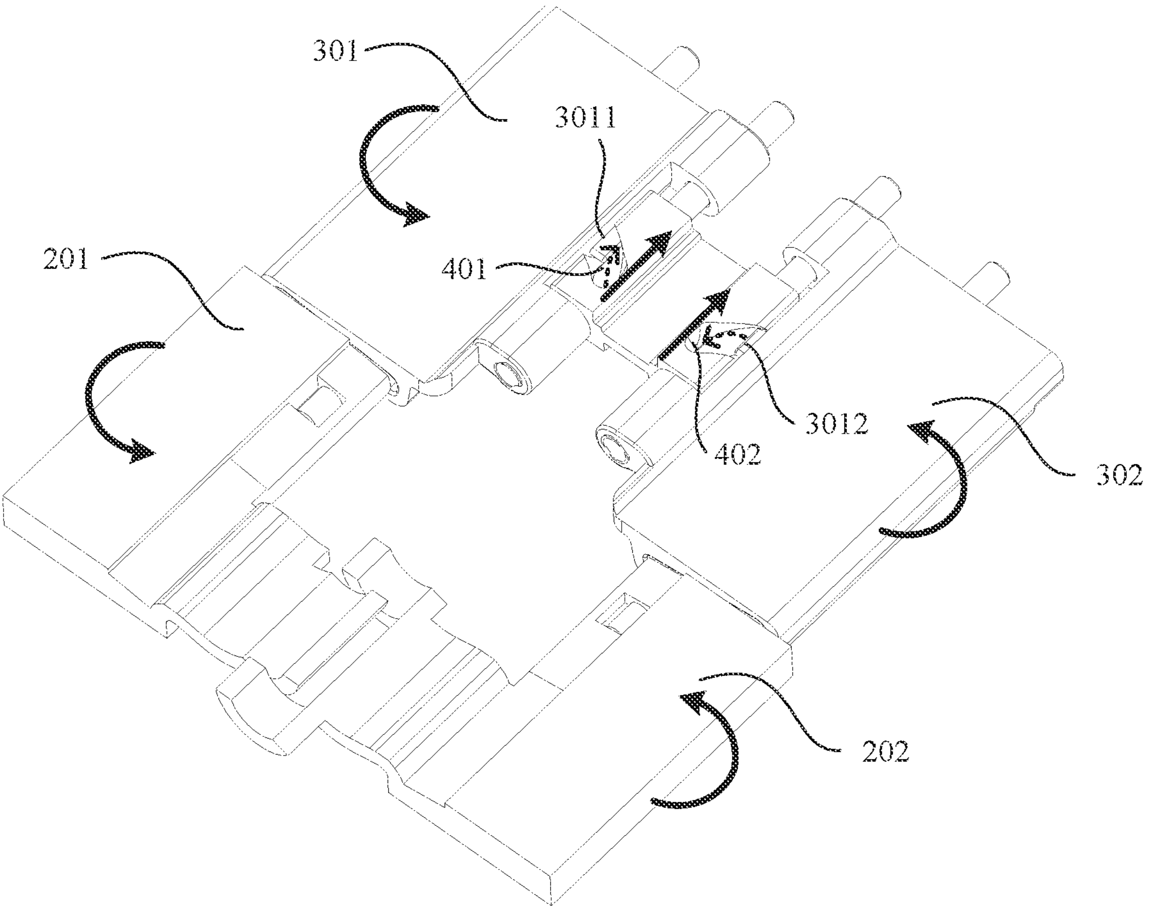
FIG. 11 is a schematic diagram of a rotating process of a foldable electronic device according to an embodiment of this application.

For example, FIG. 11 is a schematic diagram of a rotating process of a foldable electronic device according to an embodiment of this application.

In some embodiments, when a user rotates a housing at one side (for example, a housing at a left side) of the foldable electronic device, the first main swing arm 201 receives a rotating force, as shown in FIG. 11. It is assumed that the first main swing arm 201 rotates outward relative to a principal plane under the action of the rotating force. When the first main swing arm 201 rotates, the first torque swing arm 301 is driven to rotate synchronously by a slide slot or a pin shaft between the first main swing arm 201 and the first torque swing arm 301.

The first torque swing arm 301 rotates inward relative to the principal plane to drive the first slider 3011 connected to the first torque swing arm 310 to slide in a helix direction of the first helical slot 401. For a sliding direction of the first slider 3011, refer to a direction of a dashed line arrow shown on the first helical slot 401 in FIG. 11. The sliding of the first slider 3011 pushes the first helical slot 401 to drive the entire sliding member 400 to move upward in the fold line direction. For a moving direction of the sliding member 400, refer to a direction of a solid line arrow next to the first helical slot in FIG. 11. The motion of the sliding member 400 may drive, by a pushing force on the second slider 3012 applied by the second helical slot 402, the second slider 3012 to slide in a helix direction of the second helical slot. For a sliding direction of the second slider 3012, refer to a direction of a dashed line arrow shown on the second helical slot 402 in FIG. 11, that is, sliding inward along the principal plane.

The sliding of the second slider 3012 drives the second torque swing arm 302 to rotate synchronously, and a rotating direction of the second torque swing arm 302 is outward relative to the principal plane. When the second torque swing arm 302 rotates, the second main swing arm 202 is driven to rotate synchronously by a slide slot or a pin shaft between the second torque swing arm 302 and the second main swing arm 202, so that the housings at the two sides of the foldable electronic device can rotate synchronously.

According to the synchronous rotation mechanism provided in embodiments of this application, a small size of the synchronous rotation mechanism can reduce an area of a foldable electronic device occupied by the synchronous rotation mechanism while ensuring a rotation requirement of a foldable screen, so that an overall size of the foldable electronic device can satisfy a miniaturization design, to facilitate carrying by a user, thereby improving user experience. In addition, abrasion loss of the synchronous rotation mechanism can be reduced, thereby improving hardware performance of the foldable electronic device.

In some embodiments, the synchronous rotation mechanism provided in embodiments of this application is used in a foldable electronic device, including:

- a sliding member, where a first helical slot and a second helical slot are respectively provided on two sides of the sliding member; and
- a first torque swing arm and a second torque swing arm, respectively located at the two sides of the sliding member. The first torque swing arm and the second torque swing arm are rotatably connected to the sliding member separately.

The first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm.

The second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm.

In some embodiments, the synchronous rotation mechanism further includes:

- a first main swing arm, connected to the first torque swing arm by a slide slot or a pin shaft; and
- a second main swing arm, connected to the second torque swing arm by a slide slot or a pin shaft.

In some embodiments, the first helical slot is one of a trapezoidal shape, a semicircular shape, and a rectangular shape.

The second helical slot is one of a trapezoidal shape, a semicircular shape, and a rectangular shape.

In some embodiments, the first slider is a rectangular cube shape or a hemispherical shape.

The second slider is a rectangular cube shape or a hemispherical shape.

In some embodiments, when the first slider and the second slider are the rectangular cube shape, the first slider is in surface contact or line contact with the first helical slot, and the second slider is in surface contact or line contact with the second helical slot.

In some embodiments, when the first slider and the second slider are the hemispherical shape, the first slider is in point contact with the first helical slot, and the second slider is in point contact with the second helical slot.

In some embodiments, the first slider is arranged on one side of the first torque swing arm close to the sliding member.

The second slider is arranged on one side of the second torque swing arm close to the sliding member.

In some embodiments, a first shaft sleeve is provided on one side of the sliding member close to the first torque swing arm, and the first helical slot is provided at a middle position of the first shaft sleeve.

A second shaft sleeve is provided on one side of the sliding member close to the second torque swing arm, and the second helical slot is provided at a middle position of the second shaft sleeve.

In some embodiments, a third shaft sleeve and a fourth shaft sleeve are respectively provided on two ends of an inner side of the first torque swing arm close to a folding part, and the first slider is arranged on a surface between the third shaft sleeve and the fourth shaft sleeve.

A fifth shaft sleeve and a sixth shaft sleeve are respectively provided on two ends of an inner side of the second torque swing arm close to the folding part, and the second slider is arranged on a surface between the fifth shaft sleeve and the sixth shaft sleeve.

In some embodiments, the first slider is arranged on a recessed surface between the third shaft sleeve and the fourth shaft sleeve.

The second slider is arranged on a recessed surface between the fifth shaft sleeve and the sixth shaft sleeve.

In some embodiments, the first shaft sleeve is connected to the third shaft sleeve and the fourth shaft sleeve by a same cylinder shaft, so that the first torque swing arm is rotatably connected to the sliding member.

The second shaft sleeve is connected to the fifth shaft sleeve and the sixth shaft sleeve by a same cylinder shaft, so that the second torque swing arm is rotatably connected to the sliding member.

According to the synchronous rotation mechanism provided in embodiments of this application, a small size of the synchronous rotation mechanism can reduce an area of a foldable electronic device occupied by the synchronous rotation mechanism while ensuring a rotation requirement of a foldable screen, so that an overall size of the foldable electronic device can satisfy a miniaturization design, to facilitate carrying by a user, thereby improving user experience.

Based on the same technical concept, an embodiment of this application further provides a foldable electronic device including, a first housing and a second housing, where the first housing is connected to the second housing by a synchronous rotation mechanism, and the synchronous rotation mechanism includes a sliding member, a first torque swing arm, and a second torque swing arm, where a first helical slot and a second helical slot are respectively provided on two sides of the sliding member; and the first torque swing arm and the second torque swing arm are respectively located at the two sides of the sliding member, and the first torque swing arm and the second torque swing arm are rotatably connected to the sliding member separately; the first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm; and the second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm; and a foldable screen, arranged on the first housing and the second housing.

Optionally, the foldable electronic device provided in this embodiment of this application may include the synchronous rotation mechanism according to any one of the foregoing embodiments. In actual application, the synchronous rotation mechanism provided in embodiments of this application may be arranged on a folding part of the foldable electronic device. Specifically, the synchronous rotation mechanism may be arranged on two ends of the folding part of the foldable electronic device, arranged at a middle position of the folding part of the foldable electronic device, arranged throughout the folding part of the entire foldable electronic device, or the like. This is not limited in embodiments of this application.

In addition, the foldable electronic device may further include more other components, for example, a circuit board, a processor, a camera, a sensor, a microphone, and a battery. This is not limited in embodiments of this application.

The foregoing descriptions are merely specific implementations of embodiments of this application, but the protection scope of embodiments of this application is not limited thereto. Any variation or replacement within the technical scope disclosed in embodiments of this application shall fall within the protection scope of embodiments of this application. Therefore, the protection scope of embodiments of this application shall be subject to the protection scope of the claims.

The invention claimed is:

1. A synchronous rotation mechanism, comprising:

a sliding member, wherein a first helical slot and a second helical slot are respectively provided on two sides of the sliding member; and a first torque swing arm and a second torque swing arm, respectively located at the two sides of the sliding member, wherein the first torque swing arm and the second torque swing arm are rotatably connected to the sliding member separately;

wherein the first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm; and wherein the second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm.

2. The synchronous rotation mechanism according to claim 1, wherein the synchronous rotation mechanism further comprises:

a first main swing arm, connected to the first torque swing arm by a slide slot or a pin shaft; and a second main swing arm, connected to the second torque swing arm by a slide slot or a pin shaft.

3. The synchronous rotation mechanism according to claim 1, wherein the first helical slot is one of a trapezoidal shape, a semicircular shape, or a rectangular shape; and wherein the second helical slot is one of a trapezoidal shape, a semicircular shape, or a rectangular shape.

4. The synchronous rotation mechanism according to claim 1, wherein the first slider is a rectangular cube shape or a hemispherical shape; and wherein the second slider is a rectangular cube shape or a hemispherical shape.

5. The synchronous rotation mechanism according to claim 1, wherein the first slider is arranged on one side of the first torque swing arm closer to the sliding member; and wherein the second slider is arranged on one side of the second torque swing arm closer to the sliding member.

6. The synchronous rotation mechanism according to claim 1, wherein a first shaft sleeve is provided on one side of the sliding member closer to the first torque swing arm, and the first helical slot is provided at a middle position of the first shaft sleeve; and wherein a second shaft sleeve is provided on one side of the sliding member closer to the second torque swing arm, and the second helical slot is provided at a middle position of the second shaft sleeve.

7. The synchronous rotation mechanism according to claim 6, wherein a third shaft sleeve and a fourth shaft sleeve are respectively provided on two ends of an inner side of the first torque swing arm closer to the sliding member, and the first slider is arranged on a surface between the third shaft sleeve and the fourth shaft sleeve; and wherein a fifth shaft sleeve and a sixth shaft sleeve are respectively provided on two ends of an inner side of the second torque swing arm closer to the sliding member, and the second slider is arranged on a surface between the fifth shaft sleeve and the sixth shaft sleeve.

8. The synchronous rotation mechanism according to claim 7, wherein the first slider is arranged on a recessed surface between the third shaft sleeve and the fourth shaft sleeve; and wherein the second slider is arranged on a recessed surface between the fifth shaft sleeve and the sixth shaft sleeve.

9. The synchronous rotation mechanism according to claim 8, wherein the first shaft sleeve is connected to the third shaft sleeve and the fourth shaft sleeve by a same cylinder shaft, so that the first torque swing arm is rotatably connected to the sliding member; and wherein the second shaft sleeve is connected to the fifth shaft sleeve and the sixth shaft sleeve by a same cylinder shaft, so that the second torque swing arm is rotatably connected to the sliding member.

10. A foldable electronic device, comprising:

a first housing;

a second housing; and a foldable screen, arranged on the first housing and the second housing;

wherein the first housing is connected to the second housing by a synchronous rotation mechanism, and the synchronous rotation mechanism comprises a sliding member, a first torque swing arm, and a second torque swing arm;

wherein a first helical slot and a second helical slot are respectively provided on two sides of the sliding member;

wherein the first torque swing arm and the second torque swing arm are respectively located at the two sides of the sliding member, and the first torque swing arm and the second torque swing arm are rotatably connected to the sliding member separately;

wherein the first torque swing arm is provided with a first slider, and the first slider is accommodated in the first helical slot, so that the first slider slides along the first helical slot when the first torque swing arm rotates, to synchronously drive the sliding member to slide in a direction perpendicular to rotation of the first torque swing arm; and wherein the second torque swing arm is provided with a second slider, and the second slider is accommodated in the second helical slot, so that the second slider slides along the second helical slot when the second torque swing arm rotates, to synchronously drive the sliding member to slide in a direction perpendicular to rotation of the second torque swing arm.

* * * * *